Figure 4:
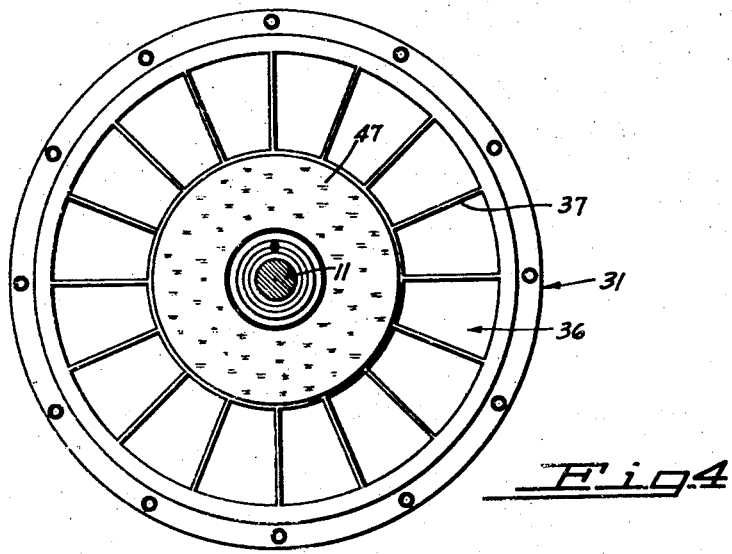
Figure 5:
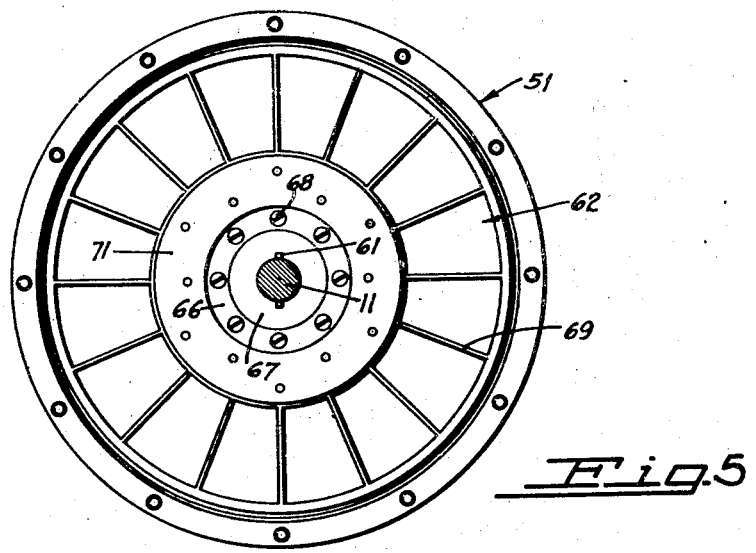
Figure 3:
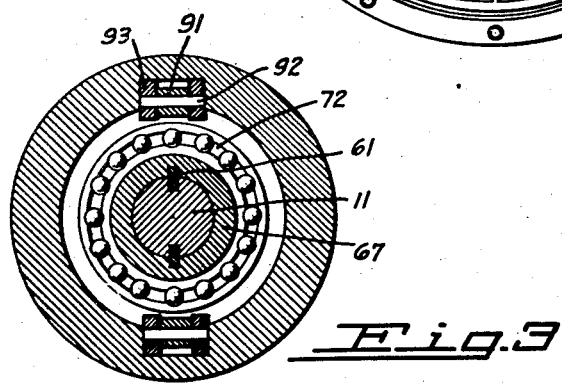

Dec. 3, 1946.   M. PEDERSEN   2,412,006
CLUTCH MECHANISM
Filed June 4, 1945   2 Sheets-Sheet 1
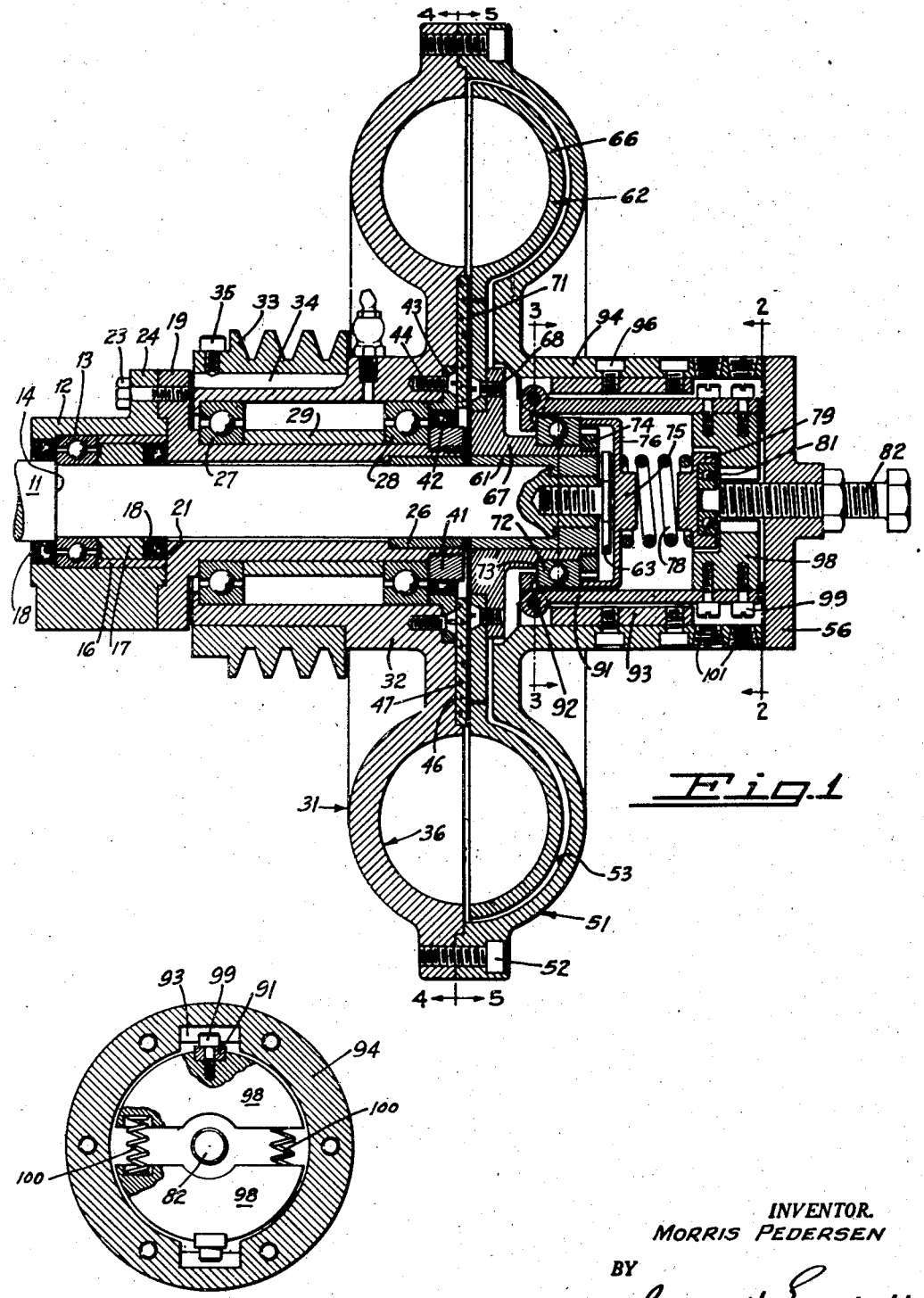
INVENTOR.
MORRIS PEDERSEN
BY
ATTORNEY Dec. 3, 1946. M. PEDERSEN 2,412,006
CLUTCH MECHANISM
Filed June 4, 1945 2 Sheets-Sheet 2

INVENTOR.
MORRIS PEDERSEN
BY
ATTORNEY

Patented Dec. 3, 1946

2,412,006

UNITED STATES PATENT OFFICE 2,412,006

CLUTCH MECHANISM

Morris Pedersen, San Francisco, Calif.

Application June 4, 1945, Serial No. 597,454

9 Claims. (Cl. 192—3.2)

1

This invention relates to clutch mechanisms.

The invention is concerned with an improved clutch construction in which a positive, friction-type clutch is included in conjunction with a clutch of the fluid type, the friction-type clutch being utilized to provide a positive driving connection between the driving and driven clutch elements, this clutch being released when the driven element has attained a speed whereat the fluid clutch is effective to provide the driving connection. The fluid-type clutch, in certain machine applications, does not provide a connection which, upon starting up of a machine is sufficiently positive. By producing a friction-type clutch, an initially positive connection can be assured. Once the machine has started and the driven element is being rotated at a sufficient rate, the fluid drive connection provided by a clutch of this type can be utilized with its obvious advantages.

It is in general the broad object of the present invention to provide an improved friction-fluid drive clutch mechanism.

Another object of the present invention is to provide a novel clutch structure.

The invention includes other objects and features of advantage, some of which, together with the foregoing, will appear hereinafter wherein the present preferred embodiment of the invention is disclosed. Referring to the drawings accompanying and forming a part hereof, Figure 1 is a side elevation partly in section.

Figures 2 through 5 are respectively sections taken along the lines 2—2, 3—3, 4—4 and 5—5 in Figure 1.

Referring to the drawings, the driven element is shown as provided by a shaft 11. This is suitably supported by a sleeve 12 in which is mounted bearing 13 on shaft 11, the bearing fitting against a shoulder 14 on the shaft. The sleeve is suitably supported as from the unit of which shaft 11 is an element. The bearing 13 is retained in position in sleeve 12 by an annular sleeve 16 and a bearing retainer 17. Oil seals 18 are provided on each side of bearing 13. A tubular member 19 is recessed as at 21 to receive a corresponding projection on sleeve 12, and several studs 23 extend through a flange 24 on sleeve 12 to retain tubular member 19 in position. At its other end, tubular member 19 is supported on the shaft by a sleeve bearing 26. Adjacent each end of tubular member 19 ball bearings 27 and 28 are positioned with spacer 29 interposed between them. The bearings are engaged with a tubular extension 32 provided on a first clutch member 31. A V-belt pulley sheave 33 is positioned on the tubular extension 32 and is secured to the extension by a key 34 retained in place by a stud 35. The first clutch member 31 is formed with a continuous annular channel 36, a plurality of radially extending veins 37 being provided in the channel to interrupt its continuity and provide a series of pockets (Figure 4).

Bearing 28 is retained in place on the tubular extension 32 by a threaded collar 41 screwed onto the end of tubular member 19. An oil seal 42 is provided between the threaded collar 41 and a flanged keeper member 43 secured to the first clutch member by a plurality of screws 44.

Secured to annular face 46 on the first clutch member is a first friction clutch element 47, indicated in the drawings as a cork facing. Also secured to the first clutch member 31 is a second clutch member 51, the two being secured together by cap screws 52. The second clutch member 51 includes a continuous annular channel 53 like the channel 36 in the first clutch member 31 except that it is free of radial vanes.

Mounted for a limited sliding movement on an end of shaft 11 and secured to this shaft by keys 61 is a third clutch element 62. The keys 61 are retained in place by a locknut 63. The third clutch member is made up of two separate members indicated by numerals 66 and 67, secured together by a plurality of screws 68. Member 67 is mounted slidably but non-rotatably upon the end of shaft 11 while member 66 is mounted upon member 67 and extends from this to rotate in the annular channel provided in member 53. Member 66 includes a plurality of radial vanes 69, generally corresponding in number to those in the first clutch member (Figure 5) to provide a plurality of pockets corresponding to those in the first clutch member 31. Mounted upon member 66 and cooperatively positioned with respect to the first friction clutch member 47 is a second friction clutch member 71, generally comprising an annular metallic disc secured to member 66.

Means are provided for positively engaging the two friction members 47 and 71 and for moving these apart when the first clutch member 31 has attained a desired speed. To engage the friction clutch members, an end thrust bearing 72 is mounted upon member 67 against a shoulder 73. The bearing 72 is retained in place by a keeper 74. Engaged with the bearing is a cup member 76. A spring 78, fitting over an extension 75 on the cup member 76, forces the friction elements positively into engagement. The other end of the spring is engaged with a spring retainer 79 supported by a bearing 81 on the end of a stud 82 which extends through plate 56. The position of the stud can be altered to vary the tension in spring 78 and so adjust the degree of frictional engagement between the two friction clutch members.

To provide for release of the friction clutch when the driving element attains a desired speed, a governor release mechanism is provided. This comprises dogs 91 mounted upon pins 92 carried upon plates 93 positioned within the tubular extension 94 by screws 96. The dogs bear upon one side of the bearings 72 while at their other ends semi-circular weights 98 (Figure 2) are secured by the screws 99. The weights carry springs 100 (Figure 2) between them to prevent chatter of the weights.

To assemble the structure, dogs 91, in position on plates 93, are secured in place by screws 96. Bearing 72 is then placed and secured by nut 74. Cup 76 is then positioned after which spring 78 and retainer 79 carrying bearing 81 are inserted. Weights 98 are then positioned and secured by screws 99. Plugs 101 and plate 56 are then secured to complete enclosure of the structure. Stud 82 is adjusted to provide the desired tension on the friction clutch and resistance to sliding of the third clutch element 62 on shaft 11 while guided by keys 61.

In operation, with the cavity between the first clutch member 31 and the second clutch member 53 filled with a suitable fluid, as a lubricating oil or other suitable fluid, the first and second friction clutch elements will be engaged under the force exerted by spring 78. If sheave 33 be rotated, the first and second friction clutch elements will be likewise turned because of the friction drive connection provided between the two friction clutch elements. When the driving portion has attained a desired speed, depending upon the tension of spring 78 and the weights 98 on dogs 91, the dogs will move outwardly under the centrifugal force resulting from rotation of the driven portion and will so move the second friction element away from the first friction element a distance sufficient to free them from a driving connection. However, by this time, the unit will be rotating and the fluid provided between the first and second clutch elements, 31 and 53, will suffice to provide the driving connection.

From the foregoing, I believe it obvious that I have provided a new and novel structure in which a positive friction connection is provided between a driving and a driven element in combination with a fluid clutch drive which automatically becomes operable upon the driven element attaining a desired speed. Shock loads and sudden power requirements are amply cared for by the driving connection provided by the fluid clutch, so that the use of the friction clutch is entirely confined to the starting up of the mechanism and normal running and operating wear and tear upon it either eliminated or held to a minimum.

The fluid clutch provides the normal driving connection between the prime mover and a machine power input shaft. As such it enables a substantially constant torque to be maintained on the input shaft. This is of advantage, for example, as when the shaft is employed to draw a paper sheet through machine, a constant tension is maintained on the sheet. The device is, therefore, of particular utility in re-spooling continuous lengths of cloth, paper, wire and like materials or in winding these on a spool after an operation such as printing has been performed on some or all of the continuous length.

I claim:

1. A clutch comprising a shaft to be driven, a first fluid clutch member mounted on said shaft for driving, a second fluid clutch member supported on said first member, said first and second fluid clutch members defining an annular fluid chamber, a third fluid clutch member slidably secured to said shaft and rotatable between said first and second fluid clutch members, friction clutch elements mounted on the annular portions of said first and third fluid clutch members, means urging said third clutch member to engage the friction clutch element thereon with the friction clutch element on said first clutch member, and means effective upon rotation of said first clutch member at a predetermined speed for separating said third clutch member from said first clutch member to disengage said friction clutch elements.

2. A clutch comprising a shaft to be driven, a first fluid clutch member mounted on said shaft for driving, a second fluid clutch member supported on said first member, said first and second fluid clutch members defining an annular fluid chamber, about the outer periphery thereof and about an inner annular portion on each of said members, each of said annular portions having a flat face thereon, a third fluid clutch member slidably secured to said shaft and rotatable between said first and second fluid clutch members, friction clutch elements mounted on the annular portions of said first and third fluid clutch members, means urging said third clutch member to engage the friction clutch element thereon with the friction clutch element on said first clutch member, and means effective upon rotation of said first clutch member at a predetermined speed for separating said third clutch member from said first clutch member to disengage said friction clutch elements.

3. A clutch comprising a shaft to be driven, a first fluid clutch member mounted on said shaft for driving, a second fluid clutch member supported on said first member, said first and second fluid clutch members defining an annular fluid chamber, a third fluid clutch member slidably secured to said shaft and rotatable between said first and second fluid clutch members, friction clutch elements mounted on the annular portions of said first and third fluid clutch members, a spring biasing said third clutch member to engage the friction clutch element thereon with the friction clutch element on the first member, a bell crank pivotally mounted on said second member for rotation therewith, said crank having one arm thereof movable to oppose the bias of said spring, and a weight on the other arm of said bell crank movable upon rotation of said first member at a predetermined speed to move said crank in a direction to separate said friction clutch elements from engagement.

4. A clutch comprising a shaft to be driven, a fluid clutch mounted on said shaft and including a driving clutch member rotatable on said shaft and a driven clutch member fixed on said shaft to drive the shaft, friction clutch elements mounted on said clutch members, and centrifugally controlled and operated means rotatable with said driving clutch member and effective upon initial rotation of said driving clutch member to maintain said friction clutch elements engaged and to disengage said clutch elements upon said driving clutch member attaining a predetermined speed.

5. A clutch comprising a shaft to be driven, a fluid clutch mounted on said shaft and including a driving clutch member rotatable on said shaft and a driven clutch member fixed on said shaft to drive the shaft, friction clutch elements mounted on said clutch members, a spring urging said elements into clutching engagement, and centrifugally operated means rotatable with said driving clutch member for overcoming said spring urge and for disengaging said clutch elements upon said driving member attaining a predetermined speed.

6. A clutch comprising a shaft, a sleeve, a bearing supporting said shaft in said sleeve with the end of the shaft projecting beyond said sleeve, a first fluid clutch member, a bearing supporting said first clutch member on said sleeve coaxially with respect to said shaft, power input means secured to said first clutch member for rotating said first clutch member, a second fluid clutch member supported on said first member, said first and second fluid clutch members defining an annular fluid chamber, a third fluid clutch member slidably secured to the projecting end of said shaft and rotatable between said first and second fluid clutch members, friction clutch elements mounted on portions of said first and third fluid clutch members, means slidably urging said third clutch member to engage the friction clutch element thereon with the friction clutch element on said first clutch member, and means effective upon rotation of said first clutch member at a predetermined speed for separating said first clutch member from said third clutch member to disengage said friction clutch elements.

7. A clutch comprising a shaft, a sleeve, a bearing supporting said shaft in said sleeve with the end of the shaft projecting beyond said sleeve, a first fluid clutch member, a bearing supporting said first clutch member on said sleeve coaxially with respect to said shaft, power input means secured to said first clutch member for rotating said first clutch member, a second fluid clutch member supported on said first member, said first and second fluid clutch members defining an annular fluid chamber, about the outer periphery thereof and about an inner annular portion on each of said members, each of said annular portions having a flat face thereon, a third fluid clutch member slidably secured to the projecting end of said shaft and rotatable between said first and second fluid clutch members, friction clutch elements mounted on portions of said first and third fluid clutch members, means urging said third clutch member to engage the friction clutch element thereon with the friction clutch element on said first clutch member, and centrifugally operated means on said second clutch member effective upon rotation of said first clutch member at a predetermined speed to move said first clutch member away from said third clutch member to disengage said friction clutch elements.

8. A clutch comprising a shaft, a sleeve, a bearing supporting said shaft in said sleeve with the end of the shaft projecting beyond said sleeve, a first fluid clutch member, a bearing supporting said first clutch member on said sleeve coaxially with respect to said shaft, power input means secured to said first clutch member for rotating said first clutch member, a second fluid clutch member supported on said first member, said first and second fluid clutch members defining an annular fluid chamber about the outer peripheral portion thereof, a third fluid clutch member slidably secured to said shaft and rotatable between said first and second fluid clutch members, friction clutch elements mounted on the central portions of said first and third fluid clutch members, means urging said third clutch member to engage the friction clutch element thereon with the friction clutch element on said first clutch member, and centrifugally operated means carried by said second clutch member and effective upon rotation of said first clutch member at a predetermined speed for separating said third clutch member from said first clutch member to disengage said friction clutch elements.

9. A clutch comprising a shaft, a sleeve, a bearing supporting said shaft in said sleeve with the end of the shaft projecting beyond said sleeve, a first fluid clutch member, a bearing supporting said first clutch member on said sleeve coaxially with respect to said shaft, power input means secured to said first clutch member for rotating said first clutch member, a second fluid clutch member supported on said first member, said first and second fluid clutch members defining an annular fluid chamber about the outer peripheral portion thereof, a third fluid clutch member slidably secured to said shaft and rotatable between said first and second fluid clutch members, friction clutch elements mounted on the central portions of said first and third clutch members, a spring biasing said third clutch member to engage the friction clutch element thereon with the friction clutch element on the first member, a bell crank pivotally mounted on said second member for rotation therewith, said crank having one arm thereof movable to oppose the bias of said spring, and a weight on the other arm of said bell crank movable upon rotation of said first member at a predetermined speed to move said crank in a direction to separate said friction clutch members.

MORRIS PEDERSEN.